Figure 1:
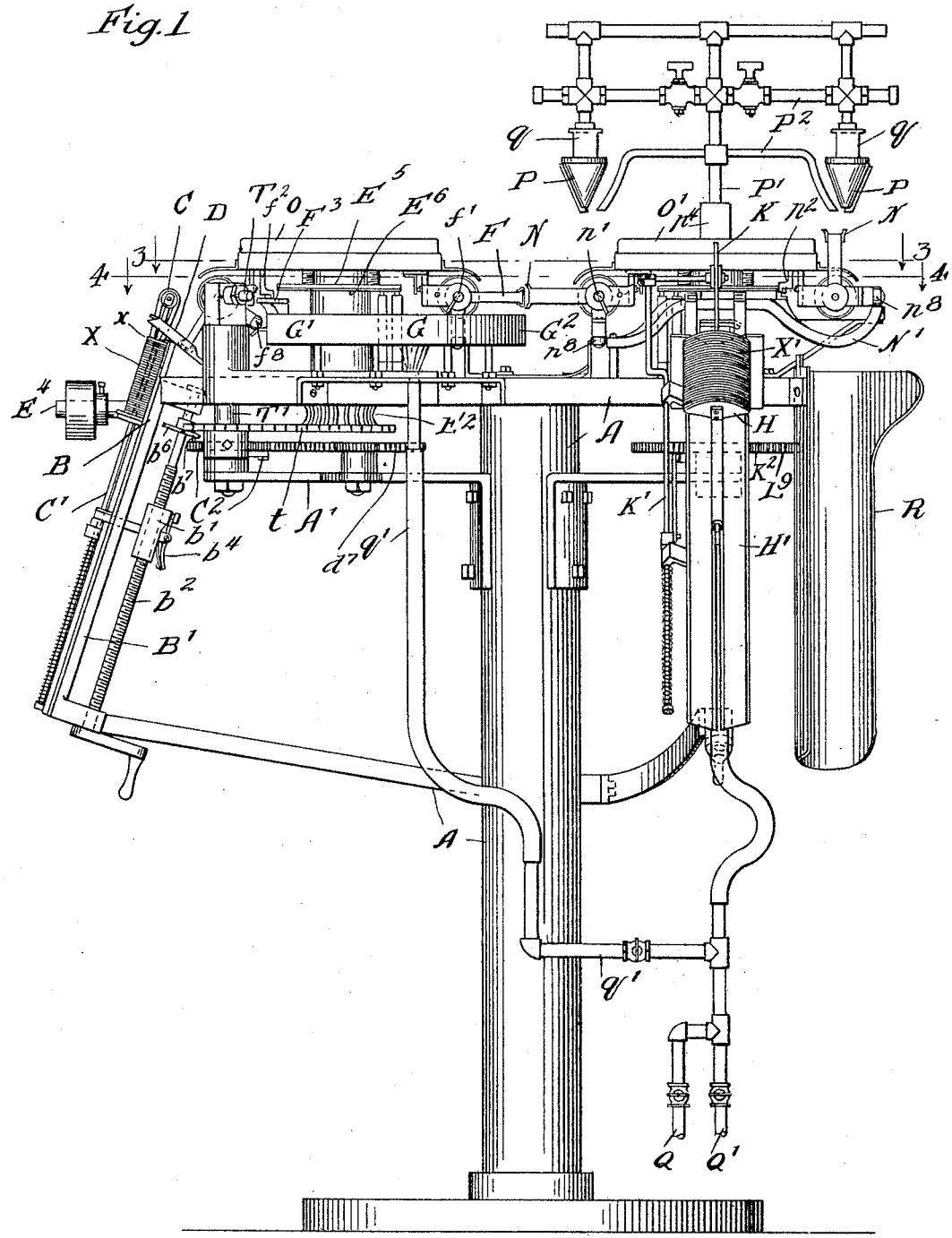

L. C. SHARP.
MACHINE FOR SOLDERING VENT CLEATS TO CAN CAPS.
APPLICATION FILED JULY 18, 1906.

958,776.

Patented May 24, 1910.

8 SHEETS—SHEET 1.

L. C. SHARP.
MACHINE FOR SOLDERING VENT CLEATS TO CAN CAPS.
APPLICATION FILED JULY 18, 1906.
958,776.
Patented May 24, 1910.
8 SHEETS—SHEET 2.
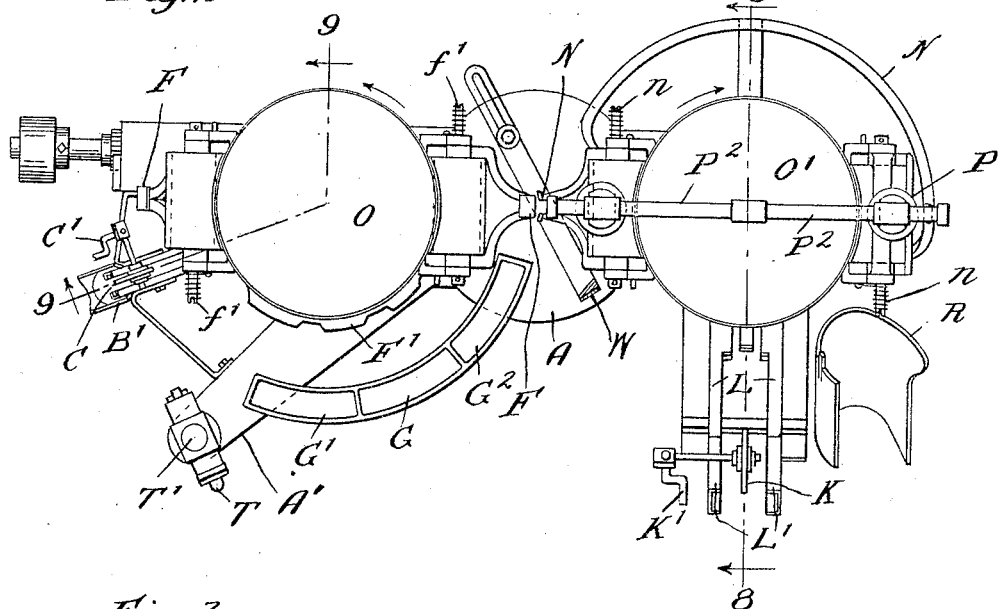
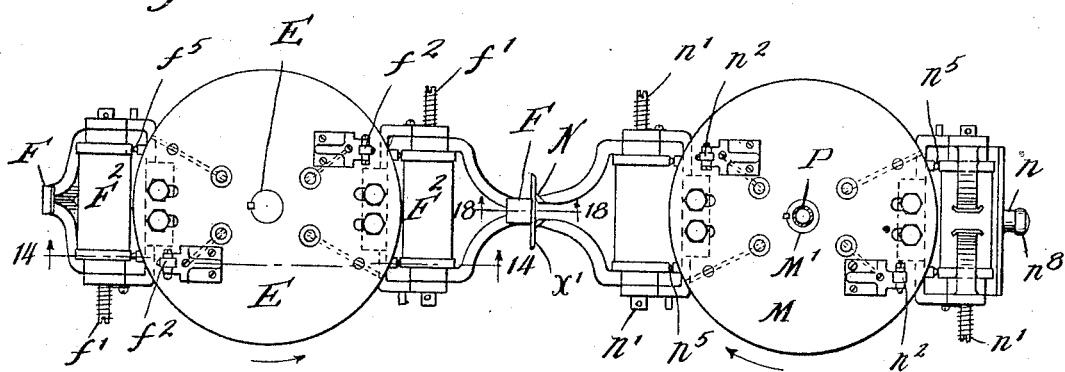
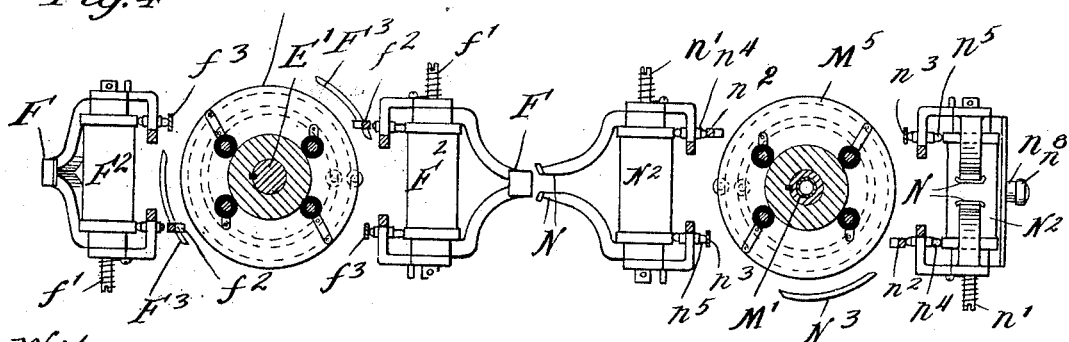
Witnesses:
Wm. Geiger
N. W. Munday
Inventor:
Lee C. Sharp.
By Munday, Evarts, Adcock & Clarke.
Attorneys

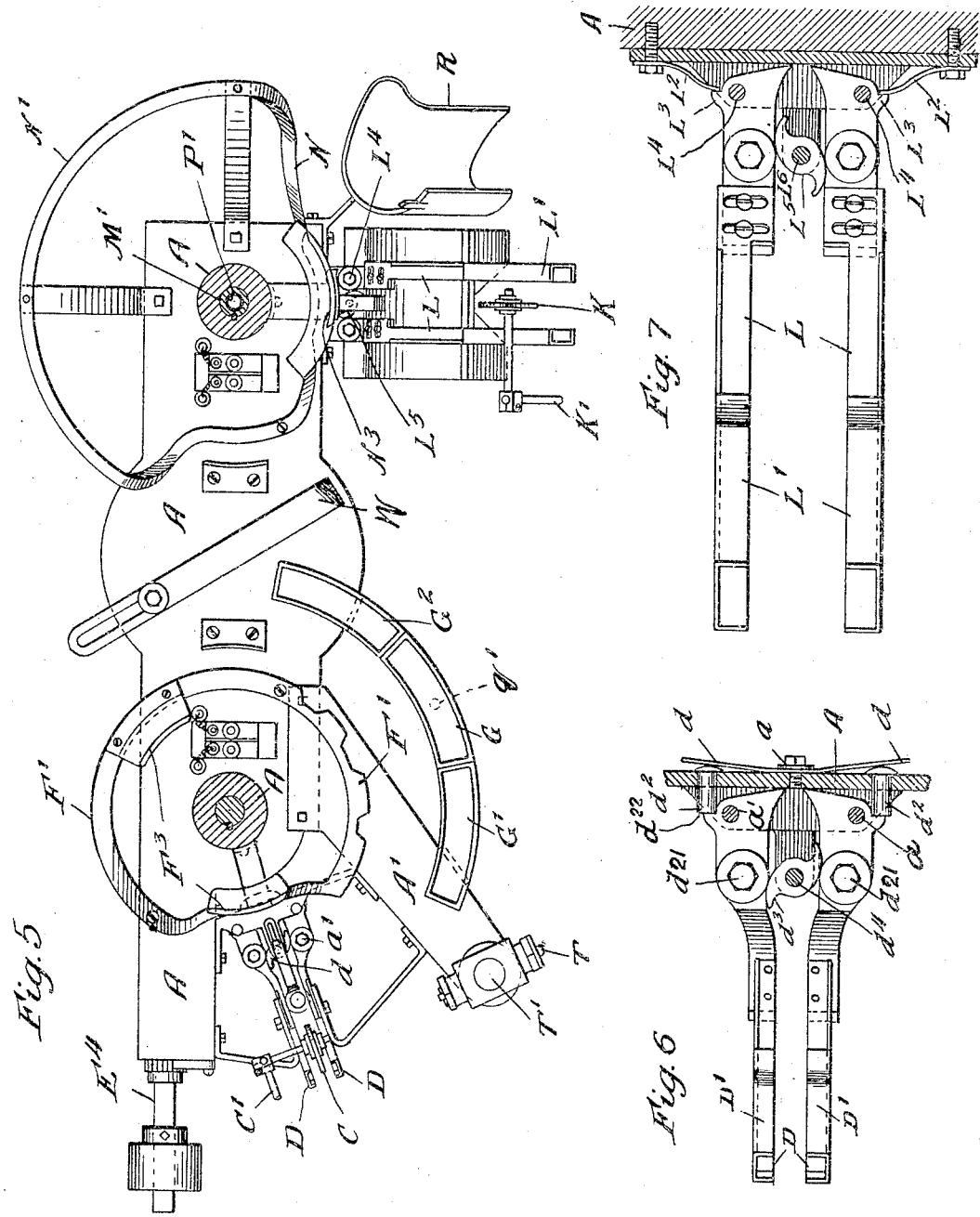

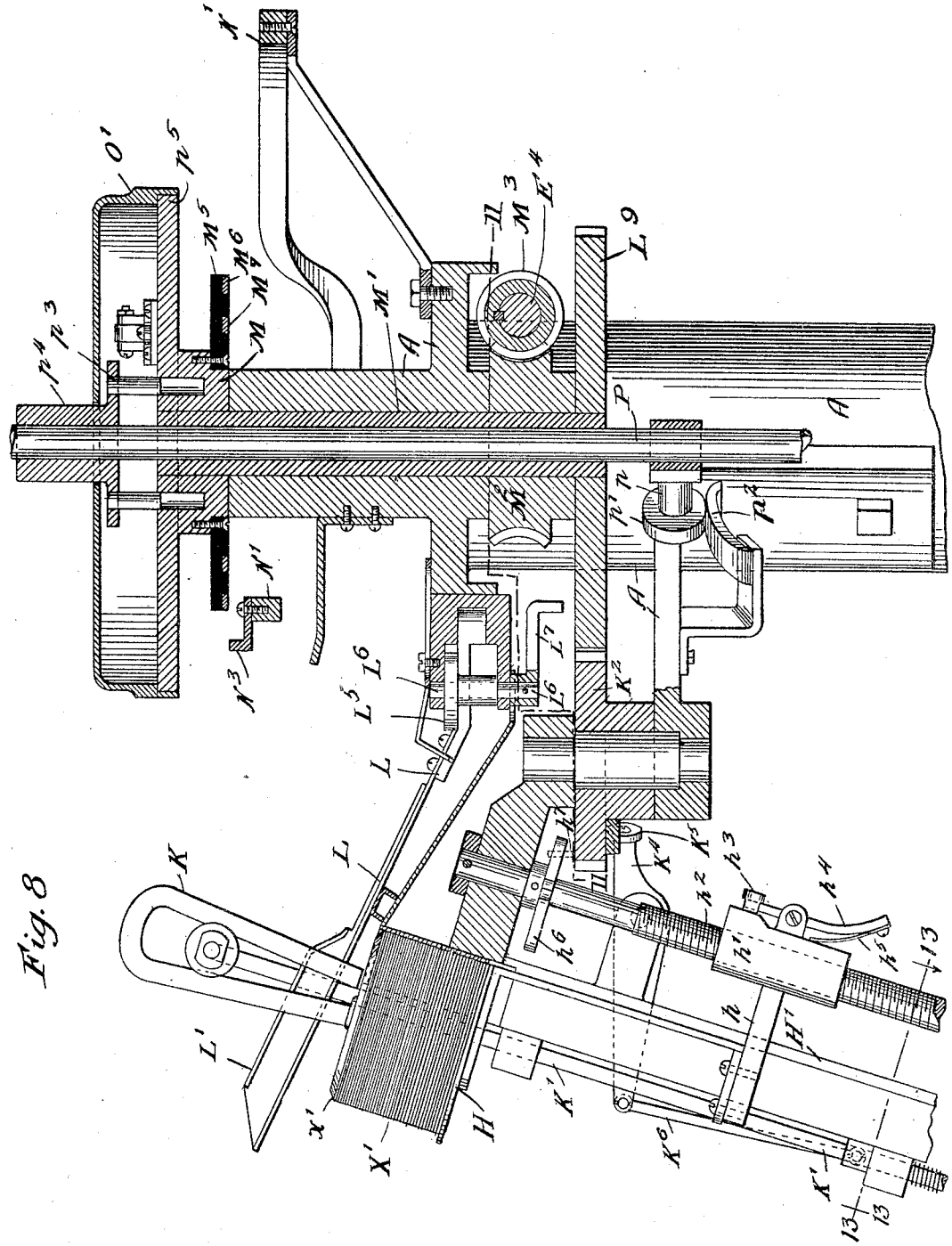

L. C. SHARP.
MACHINE FOR SOLDERING VENT CLEATS TO CAN CAPS.
APPLICATION FILED JULY 18, 1906.
958,776.
Patented May 24, 1910.
8 SHEETS—SHEET 5.
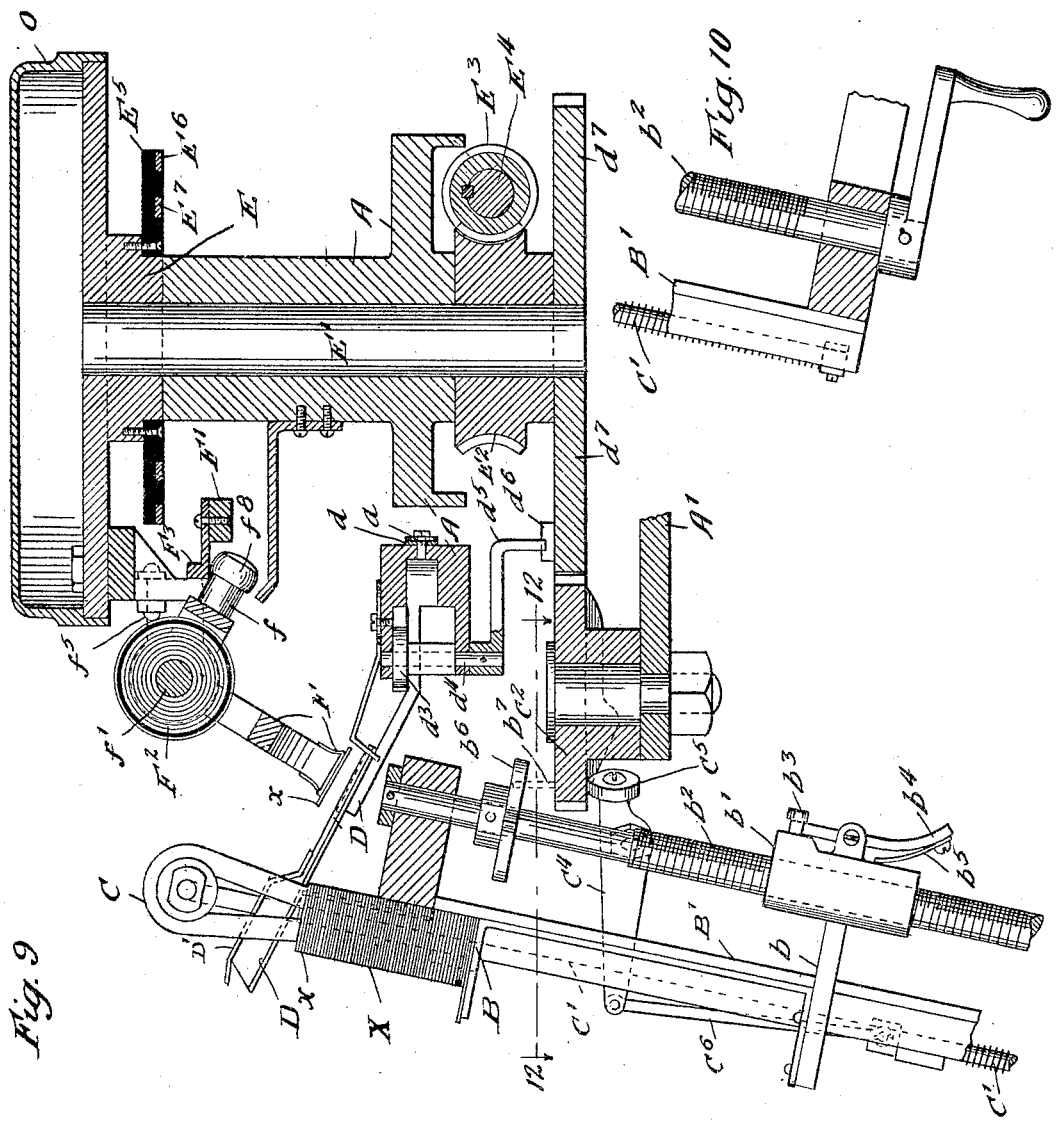

L. C. SHARP.
MACHINE FOR SOLDERING VENT CLEATS TO CAN CAPS.
APPLICATION FILED JULY 18, 1906.
958,776.
Patented May 24, 1910.
8 SHEETS—SHEET 6.
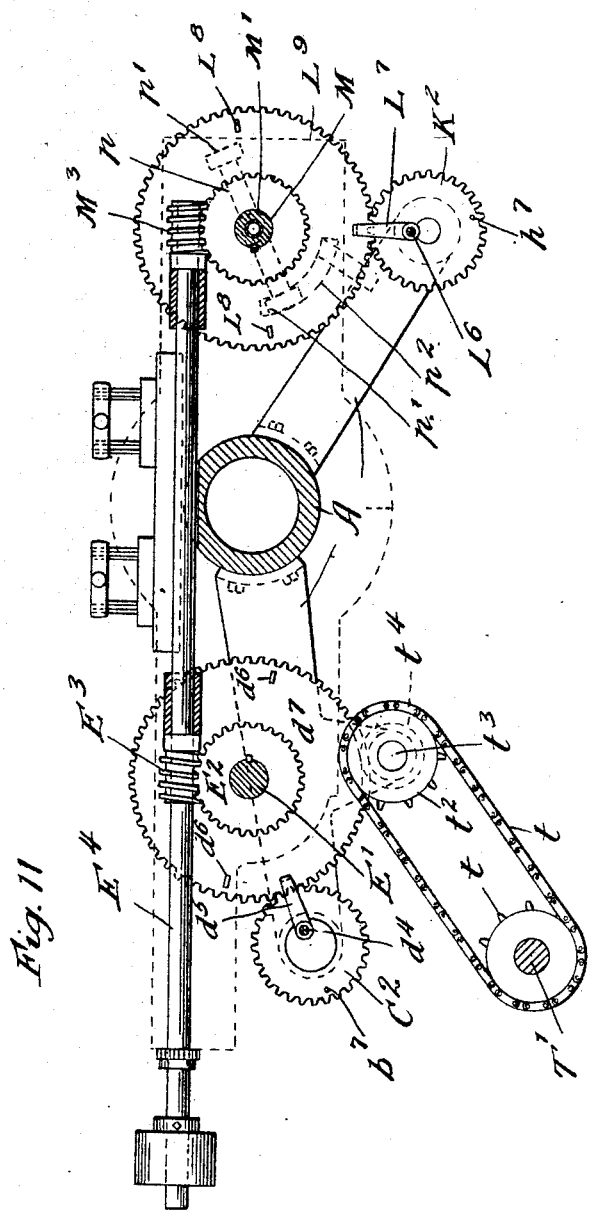
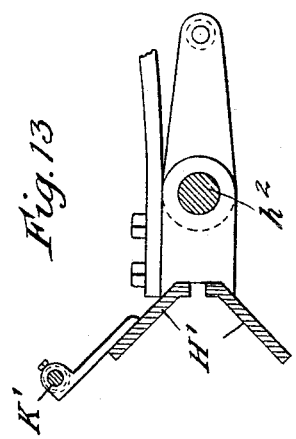
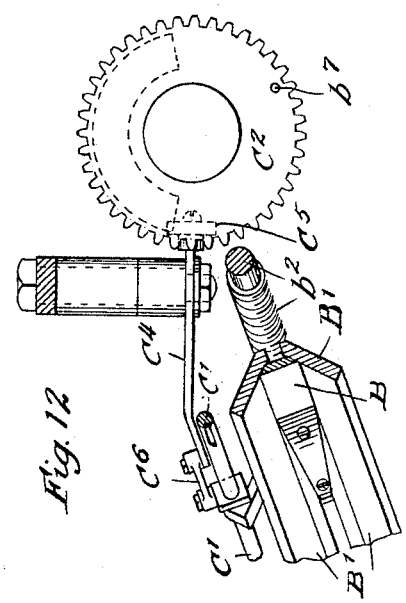
Witnesses:
Wm. Geiger
N. W. Munday
Inventor:
Lee C. Sharp.
By Munday, Evarts, Adcock & Clarke
Attorneys L. C. SHARP.
MACHINE FOR SOLDERING VENT CLEATS TO CAN CAPS.
APPLICATION FILED JULY 18, 1906.
958,776.
Patented May 24, 1910.
8 SHEETS—SHEET 7.
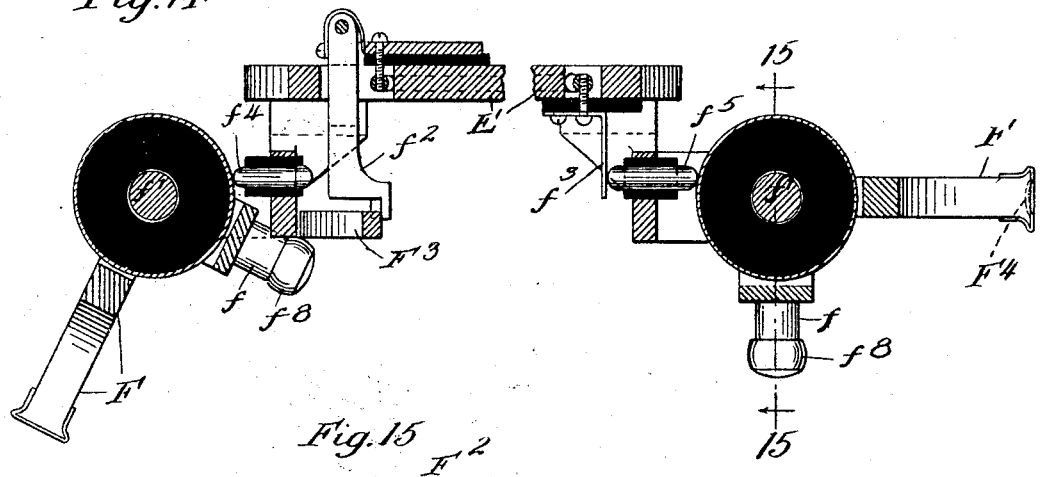
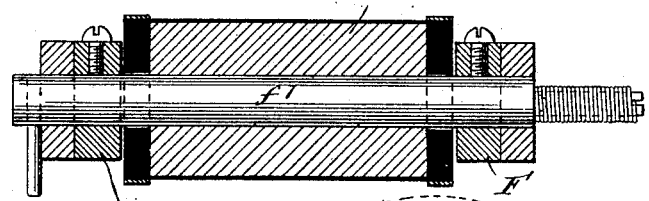
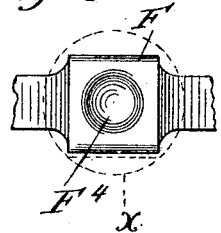
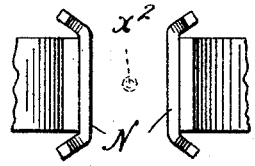
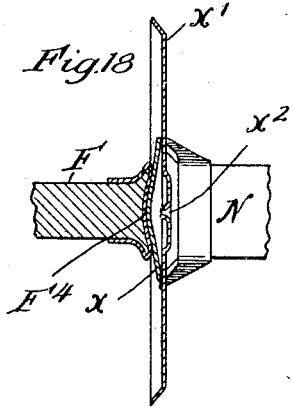
Witnesses
Wm. Geiger
Inventor:
Lee C. Sharp
By Munday, Evarts, Adcock & Clarke
Attorneys L. C. SHARP.
MACHINE FOR SOLDERING VENT CLEATS TO CAN CAPS.
APPLICATION FILED JULY 18, 1906.
958,776.
Patented May 24, 1910.
8 SHEETS—SHEET 8.
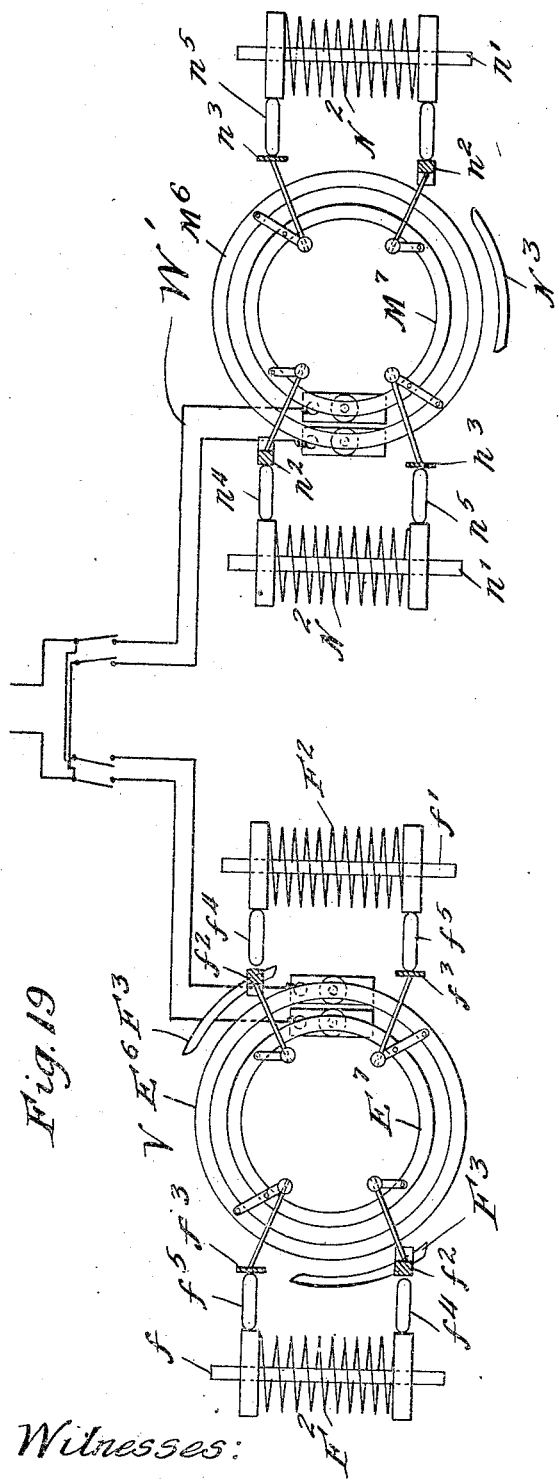
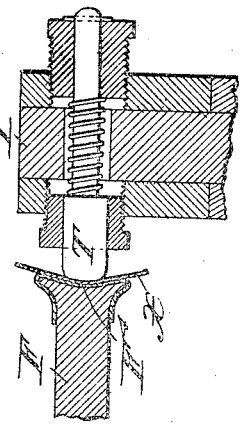
Witnesses:
Wm. Geiger
Inventor:
Lee C. Sharp
By Munday, Evarts, Adcock & Clarke.
Attorneys

UNITED STATES PATENT OFFICE.

LEE C. SHARP, OF OMAHA, NEBRASKA, ASSIGNOR TO AMERICAN CAN COMPANY, OF NEW YORK, N. Y., A CORPORATION OF NEW JERSEY.

MACHINE FOR SOLDERING VENT-CLEATS TO CAN-CAPS.

958,776.   Specification of Letters Patent.   Patented May 24, 1910.

Application filed July 18, 1906. Serial No. 326,678.

*To all whom it may concern:*

Be it known that I, LEE C. SHARP, a citizen of the United States, residing in Omaha, in the county of Douglas and State of Nebraska, have invented a new and useful Improvement in Machines for Soldering Vent-Cleats to Can-Caps, of which the following is a specification.

My invention relates to machines for soldering vent cleats or clips to can caps.

Heretofore vent cleats or clips (which are secured on the inside of can caps of preserving cans for meat, fish and other articles to prevent the contents of the can from closing up the vent hole in the can cap during the processing of the goods,) have usually been soldered to the caps by hand, and is a slow, laborious and expensive operation and requires a comparatively large amount of solder, thus adding materially to the cost of the cans.

The object of my invention is to provide an automatic machine of a simple, efficient and durable construction, by means of which vent cleats or clips may be automatically, rapidly and cheaply soldered to can caps without hand labor, and by which the quantity of solder required to secure the clips to the can caps may be materially reduced.

My invention consists in the means I employ to practically accomplish this object or result; that is to say, it consists in an automatic vent cleat soldering machine, comprising, in coöperative combination, a clip feeder by which the clips are fed one by one from a pile or stack, a movable clip carrier furnished with a plurality of clip holders to which the clips are automatically delivered from the feeder, the clip holder having a rocking or dipping movement, a fluxing device and a molten solder bath into which one edge of the clip is dipped to apply thereto the solder necessary for securing it to the can cap, a can cap feeder, a carrier furnished with a plurality of can cap holders to which the caps are automatically delivered from the cap feeder, the can cap carrier and cap holders thereon coöperating with the clip carrier and clip holders thereon to receive and assemble the clips with the can caps in position for being soldered together, and a plurality of soldering irons for fusing the solder applied to the clips and soldering the same to the can caps.

My invention also consists in the novel construction of parts and devices, and in the novel combinations of parts and devices herein shown or described.

In the accompanying drawing forming a part of this specification, Figure 1 is a side elevation of an automatic can cap clip soldering machine embodying my invention. Fig. 2 is a plan view. Fig. 3 is a horizontal section on line 3—3 of Fig. 1, with the cap plates of the clip carrier and can cap carrier removed. Fig. 4 is a horizontal section on line 4—4 of Fig. 1. Fig. 5 is a detail plan view partly in horizontal section showing the cam tracks. Fig. 6 is a detail plan view partly in section showing the clip feed passage or chute. Fig. 7 is a detail plan view partly in section showing the can cap feed passage or chute. Fig. 8 is a detail vertical section on line 8—8 of Fig. 2. Figs. 9 and 10 taken together are a detail vertical section on line 9—9 of Fig. 2. Fig. 11 is a detail horizontal section on line 11—11 of Fig. 8. Fig. 12 is a detail section on the broken line 12—12 of Fig. 9. Fig. 13 is a detail section on line 13—13 of Fig. 8. Fig. 14 is an enlarged detail section on line 14—14 of Fig. 3. Fig. 15 is a detail section of certain parts on line 15—15 of Fig. 14. Fig. 16 is a detail face view of one of the clip holders. Fig. 17 is a detail face view of one of the cap holders. Fig. 18 is a sectional view on line 18—18 of Fig. 3 showing the cap and clip assembled and Fig. 19 is a detail diagrammatic view showing the electric circuit. Fig. 20 is a detail view illustrating the coöperative action of the clip shaper or bumper and clip holder in shaping the clip.

In the drawing, A represents the frame of the machine, B a rack for holding a pile or stack X of clips *x*.

C is the clip feeder, the same consisting preferably of a permanent magnet.

D is the clip delivery device, the same consisting preferably of an inclined two part or opening and closing chute.

E is the clip carrier consisting preferably of a rotary turret.

F F are the clip holders on the clip carrier, the same consisting preferably of an electro magnet.

G is the molten solder bath into which the lower rim or edge of the clip *x* is dipped as it is conveyed around by the carrier E.

H is the rack for the pile or stack $X^1$ of can caps $x^1$.

K is the feeder for the can caps.

L is the can cap delivery device or chute, M the can cap carrier, N the can cap holders on the carrier and P the soldering irons.

The rack B for the pile of clips X is preferably arranged in a slightly inclined position and slides upward on a suitable guide $B^1$ as the clips are fed one by one by the feeder C so as to present the upper clip of the pile or stack in substantially the same coöperative relation to the feeder. The rack B is thus automatically moved or operated by an arm $b$ on a block $b^1$ which is engaged by a screw shaft $b^2$. The block $b^1$ has a screw blade or finger $b^3$ which engages the screw threads on the shaft $b^2$. When it is desired to move the clip rack B independent of the screw shaft $b^2$ the screw blade or finger $b^3$ may be retracted by the lever $b^4$ which is furnished with a spring $b^5$ to hold the screw blade or finger $b^3$ normally in engagement. The screw shaft $b^2$ is operated as required by a spider or radially armed wheel $b^6$ thereon which is engaged by a pin $b^7$ on the gear cam wheel $C^2$. The clip feeder C preferably consists, as before stated, of a permanent or steel magnet and it is reciprocated up and down as required to lift the uppermost clip $x$ of the stack or pile X above the clip delivery device or chute D by means of a reciprocating slide $C^1$ which is operated from the cam wheel $C^2$ through the lever $C^4$, having a roller $C^5$, and connecting link $C^6$.

The clip chute or delivery device D comprises two opening and closing members between which the feeder C reciprocates, the members D D opening to permit the passage of the clip between them as the feeder C moves upward and then closing to support the clip. The clip is freed from the feeder or magnet C by guards $D^1$ with which the chute or delivery device D is provided. The two members of the chute D are normally held closed by a spring $d$ secured to the frame by a screw $a$ and engaging pins $d^2$ mounted in the frame A and engaging shoulders $d^{22}$ on the members D D of the chute or delivery device. The members D D are pivotally connected to the frame at $a^1$ and are opened by a revolving cam $d^3$ on the shaft $d^4$ which engages anti-friction rollers $d^{21}$ on the chute members $D^1$. The shaft $d^4$ is turned at intervals as required by an arm $d^5$ thereon which is engaged by projections $d^6$ on the gear $d^7$.

The clip carrier E consists preferably of a continuously revolving turret having an upright shaft $E^1$ furnished with a worm gear $E^2$ engaging a worm $E^3$ on the driving shaft $E^4$. The clip holders F on the clip carrier E having a rocking or oscillating movement on the carrier E so as to present the face of the holder F in an inclined position corresponding to the chute or delivery device D, and then, after the clip $x$ is grasped by the holder F, to turn the clip into a substantially upright position for presentation of its edge to the acid or flux bath $G^1$ and solder bath G and the second acid or flux bath $G^2$. The clip holder F is furnished with an operating arm $f$ carrying an anti-friction roller $f^8$ which is engaged by a stationary cam track $F^1$ on the frame of the machine for imparting to the holder F its necessary rocking or oscillating movement about its axis or shaft $f^1$. The clip holder F is preferably of soft iron and its means for gripping the clip $x$ consists preferably of an electro magnet of which $F^2$ is the coil.

The electro magnet is energized or a current passed through the coil $F^2$ at the time when the carrier E brings the holder F adjacent to and above the clip $x$ on the chute or clip delivery device D, thus causing the clip to adhere to the holder F and the holder F remains thus magnetically energized while the clip is being presented to the clip shaper or bumper T, the acid or fluxing bath $G^1$, the solder bath G, the second acid or fluxing bath $G^2$ and to the holder N of the can cap carrier M, when the holder F is deënergized, so that the clip $x$ be transferred to the cap $x^1$ and holder N of the cap carrier M.

The carrier E is furnished with an insulating ring $E^5$ provided with metal rings $E^6$ $E^7$, which form part of the electric circuit. And the coil $F^2$ of the electro magnet is connected and disconnected from the electric circuit as required by means of the contact makers $f^2$ $f^3$, through the connections $f^4$ $f^5$ the movable contact piece $f^2$ being operated as required by means of stationary cams $F^3$ on the frame of the machine.

The clip shaper or bumper T is carried on an arm or bracket $A^1$ forming part of the frame of the machine and turns horizontally on an upright shaft $T^1$ so as to engage the clip $x$ on the holder F as the carrier E rotates. The holder F has a dished or curved face $F^4$ to enable the clip shaper or bumper T to properly curve the clip as required to leave an open space between it and the cap $x^1$ at the vent hole $x^2$ therein. The clip shaper or bumper T is rotated as required to properly mesh, like a gear, with the clip holder F on the carrier E by means of a sprocket wheel $t$ on its shaft $T^1$ which is engaged by a sprocket chain $t^1$ meshing with a sprocket wheel $t^2$ on the shaft $t^3$, which has a gear $t^4$ meshing with a gear $d^7$ on the carrier shaft $E^1$. The rotating clip shaper or bumper T coöperates, like the tooth of a gear with the curved or dished face of the clip holder F as the latter is carried around by its carrier, to bend or shape the clip to conform to the curved face of the clip holder; it being understood that the clip shaper T rotates continuously as does also the carrier of the clipholder.

The can cap rack H, feeder K and chute or delivery device L are preferably similar in construction and operation to the clip rack B, feeder C and delivery device D; and the same also generally applies to the can cap carrier M and cap holder N which correspond in general construction to the clip carrier E and clip holder F.

The can cap rack H slides on a suitably inclined guide $H^1$ and is operated by an arm $h$ on the movable block $h^1$ which has a screw blade or finger $h^3$ engaged by the threads of the screw shaft $h^2$. The screw blade or finger $h^3$ has a lever $h^4$ and spring $h^5$. The screw shaft $h^2$ is operated by a spider $h^6$ thereon which is engaged by a pin $h^7$ on the gear or cam wheel $K^2$. The can cap feeder K, which is preferably a permanent or steel magnet, is reciprocated up and down as required by means of a slide $K^1$, which is operated from the cam wheel $K^2$ by a lever $K^4$ having a roller $K^5$ and connected by a link $K^6$ with the slide $K^1$. The two part or opening and closing can cap delivery device or chute L is furnished with a guard $L^1$ to free the caps from the magnet K and cause them to drop down upon the chute L. The two members of the chute L are normally held closed by springs $L^2$ which engage shoulders $L^3$ on the chute members L. The members L L of the chute are pivoted to the frame at $L^4$ and are opened by a revolving cam $L^5$ on the shaft $L^6$ which is turned at intervals as required, by an arm $L^7$ thereon which is engaged by projections $L^8$ on the gear $L^9$ which is connected to the shaft $M^1$ of the carrier M. The can cap carrier M is revolved continuously by means of a worm gear $M^2$ on its shaft $M^1$ which meshes with a worm $M^3$ on the driving shaft $E^4$.

The cap holders N on the cap carrier M have a rocking or oscillating movement to present the holder N in the different positions required for coöperating with the other parts; that is to say, in an inclined position for coöperation with the cap chute or delivery device L, in a vertical position for coöperation with the clip holder F and clip carrier E, and in a horizontal position for coöperation with the soldering irons P. The cap holder N is furnished with a bearing arm $n$ carrying an anti-friction roller $n^8$ which is engaged by a stationary cam track $N^1$ on the frame of the machine for imparting to the holder N its necessary rocking or oscillating movement about its axis or shaft $n^1$. The cap holder N is preferably of soft iron and its means for gripping the cap $x^1$ consists preferably of an electro magnet of which $N^2$ is the coil. The electro magnet is energized or a current passed through said coil $N^2$ at the time when the carrier M presents the holder N adjacent to and above the cap $x^1$ on the chute or cap delivery device L, thus causing the cap to adhere to the holder N; and the holder N remains thus magnetically energized during the operation of assembling the clip on the cap and during the operation of fusing the solder on the clip and soldering the clip to the cap by action of the soldering irons P, and while the solder is setting and the cap with the clip soldered thereto is being conveyed around by the carrier M to the discharge chute R, at which point the current is shut off and the electro magnet deënergized, thus permitting the completed article to be discharged from the machine into the chute R.

The carrier M is furnished with an insulating ring $M^5$ provided with metal rings $M^6$ $M^7$ which form part of the electric circuit. The coil $N^2$ of the electric magnet is connected and disconnected from the electric circuit as required, by means of the contact makers $n^2$ $n^3$, through the connections $n^4$ $n^5$ the movable contact piece $n^2$ being operated as required by means of a stationary cam $N^3$ on the frame of the machine.

The soldering irons P are reciprocated as required to bring them into contact with the assembled clip and cap on the holders N through a reciprocating shaft $P^1$ having arms $P^2$ for supporting the soldering irons, and which is provided with radial arms $p$ having rollers $p^1$ which engages a stationary cam $p^2$ on the frame of the machine. The shaft $P^1$ is caused to revolve with the shaft $M^1$ by means of studs $p^3$ on the head $p^4$ and which engage a head $p^5$ which is secured to said carrier shaft $M^1$. Covers O and $O^1$ serve to protect the electric connections on the carriers E and M respectively.

Q, $Q^1$ are gas and air supply pipes leading to the burners $q$ for heating the soldering irons and $q^1$ for heating the solder in the solder bath or vessel G.

V represents the electric circuit in which the electric magnets for the clip holders are included, and $W^1$ the electric circuit in which the electric magnets for the cap holders are included.

W is an adjustable guide on the frame of the machine for centering the can cap on the cap holder as the can cap carrier rotates.

I claim:—

1. In a machine for automatically soldering vent clips to can caps, the combination with a clip feeder, of a delivery device for the clips, a clip carrier furnished with a plurality of rocking clip holders, a flux bath, a molten solder bath into which one edge of the clip is dipped as it is carried around by the carrier and holder, a clip shaping device, a can cap feeder, a delivery device for the can caps, a cap carrier furnished with a plurality of rocking can cap holders and a plurality of soldering irons for fusing the solder applied to the clips and soldering the same to the can caps, substantially as specified.

2. In a machine for automatically soldering vent clips to can caps, the combination with a solder bath, of a clip carrier furnished with a plurality of clip holders, a can cap carrier furnished with a plurality of cap holders adapted to receive the clips from the holders of the clip carrier and a plurality of soldering irons, substantially as specified.

3. The combination with a clip carrier having clip holders, of a magnetic cap carrier having cap holders, means for transferring the clips from the clip carrier to the cap carrier and assembling the same on the caps, and soldering irons for soldering the clips on the caps while the clip and cap are clamped together by the magnetic cap holder, substantially as specified.

4. The combination with a clip supporting rack, of a clip feeder and a clip delivery device through which the clip feeder passes, said delivery device having separable members which open to permit the clip to pass between them to receive the clip when released by the feeder, substantially as specified.

5. The combination with a rack for supporting a pile of sheet metal pieces, of a reciprocating feeder and a two part chute comprising laterally opening and closing members between which the feeder reciprocates, said members opening to permit the metal pieces to pass between said members, and closing to receive the metal pieces when released by the feeder, substantially as specified.

6. The combination with a rack for supporting a pile of sheet metal pieces, of a reciprocating feeder and a two part chute comprising laterally opening and closing members between which the feeder reciprocates, and means for automatically moving the members of said supporting rack, substantially as specified.

7. The combination with a supporting rack for pieces of sheet metal, of a reciprocating magnetic feeder and a delivery device having two opening and closing members between which the feeder reciprocates, said delivery device being provided with a guard to strip the pieces of sheet metal from the feeder, substantially as specified.

8. The combination with a supporting rack for pieces of sheet metal, of a reciprocating magnetic feeder, and a delivery device having two opening and closing members between which the feeder reciprocates, said delivery device being provided with a guard to strip the pieces of sheet metal from the feeder, means for moving the supporting rack and means for opening and closing the two members of the delivery device, substantially as specified.

9. The combination with a rotary clip carrier having holders thereon, of a rotary clip shaper coöperating with said holder to shape the clip held thereon, substantially as specified.

10. The combination with a clip carrier having holders thereon, of a clip shaper coöperating with said holder to shape the clip held thereon, and a solder bath, said clip carrier coöperating with said shaper to shape the clip and with said solder bath to apply solder to the edge of the clip, substantially as specified.

11. The combination with a clip carrier having holders thereon, of a clip shaper coöperating with said holder to shape the clip held thereon, a solder bath and a flux bath, said clip carrier coöperating with said shaper to shape the clip and with said solder bath to apply solder to the edge of the clip, substantially as specified.

12. The combination with a clip carrier having holders thereon, of a clip shaper, a solder bath, a flux bath and a cam track for causing the clip holders to dip the edge of the clips in the flux and solder baths, substantially as specified.

13. The combination with a rotary can cap carrier having cap holders, of a clip carrier having rotary clip holders, said carriers rotating together, and means for soldering the can cap and clip together, substantially as specified.

14. The combination with a rotary can cap carrier having cap holders, of a rotary clip carrier having clip holders, said carriers rotating together, and means for transferring the clips from the holders of the clip carrier to the holders of the cap carrier, and means for soldering the can cap and clip together, substantially as specified.

15. The combination with a rotary can cap carrier having electromagnetic cap holders thereon, of a rotary clip carrier having electro magnetic clip holders thereon, said carriers rotating together, substantially as specified.

16. The combination with a can cap carrier having electro magnetic cap holders thereon, of a clip carrier having electro magnetic clip holders thereon, and means for deënergizing the electro magnet of the clip holder to cause the clip to be transferred from the clip holder to the cap holder and to be assembled with the cap, substantially as specified.

17. The combination with a rotary can cap carrier having electro magnetic cap holders thereon, of a rotary clip carrier having electro magnetic clip holders thereon, said carriers rotating together, and means for deënergizing the electro magnet of the clip holder to cause the clip to be transferred from the clip holder to the cap holder and to be assembled with the cap, and soldering irons, substantially as specified.

18. The combination with a can cap carrier having electro magnetic cap holders thereon, of a clip carrier having electro magnetic clip holders thereon, and means for deenergizing the electro magnet of the clip holder to cause the clip to be transferred from the clip holder to the cap holder and to be assembled with the cap, and means for soldering the clips on the caps while held and carried by the cap holders, substantially as specified.

19. The combination with a clip carrier having clip holders thereon, of means for applying solder to the edge of the clip, a cap carrier having cap holders, means for transferring the clip from the clip carrier to the cap carrier, and assembling it with the cap, and means for soldering the clip and cap together, substantially as specified.

20. In a machine for soldering vent clips on can caps, the combination with a carrier furnished with electro magnetic holders for the can caps, means for delivering the clips on the can caps as they are conveyed by said carrier and means for soldering the clips and caps together while held together by said magnetic holders of the cap carrier, substantially as specified.

21. In a machine for soldering vent clips on can caps, the combination of a clip carrier provided with an electro magnetic cap holder, of a cap carrier provided with an electro magnetic cap holder, substantially as specified.

22. In a machine for soldering vent clips on can caps, the combination of a clip carrier provided with an electro magnetic clip holder, of a cap carrier provided with an electro magnetic cap holder, means for transferring the clip from the clip carrier to the cap carrier and assembling it with the cap, and means for soldering the cap and clip together, substantially as specified.

23. In a machine for soldering vent clips on can caps, the combination of a clip carrier provided with an electro magnetic clip holder, of a cap carrier provided with an electro magnetic cap holder, means for transferring the clip from the clip carrier to the cap carrier and assembling it with the cap, means for soldering the cap and clip together, and means for automatically feeding and delivering the clips to the clip carrier, substantially as specified.

24. In a machine for soldering vent clips on can caps, the combination of a clip carrier provided with an electro magnetic clip holder, of a cap carrier provided with an electro magnetic cap holder, means for transferring the clip from the clip carrier to the cap carrier and assembling it with the cap, means for soldering the cap and clip together, means for automatically feeding and delivering the clips to the clip carrier, and means for automatically feeding and delivering the caps to the cap carrier, substantially as specified.

25. The combination with a clip feeder, of a clip carrier having clip holders, of a cap feeder, and a cap carrier having cap holders, said cap holders having electro magnets to clamp the clip and cap together, substantially as specified.

26. The combination with a clip feeder, of a clip carrier having clip holders to which the clips are delivered by said feeder, of a can feeder, a can carrier having cap holders, said cap holders having electro magnets to clamp the clip and cap together, and soldering devices adjacent to the path of the holders on one of said carriers, substantially as specified.

27. The combination with a clip carrier having rocking electro magnetic clip holders, and a solder bath into which the edges of the clips are dipped by said carrier and clip holders to apply solder thereto, substantially as specified.

28. The combination with a clip carrier having rocking clip holders, a solder bath into which the edges of the clips are dipped to apply solder thereto, and a cap carrier having cap holders and means for transferring the clips from the clip carrier to the cap carrier, substantially as specified.

29. The combination with a clip carrier, having rocking clip holders, a solder bath into which the edges of the clips are dipped to apply solder thereto, and a cap carrier having cap holders and means for transferring the clips from the clip carrier to the cap carrier, and means for soldering the caps and clips together, substantially as specified.

30. In a machine for soldering vent clips on can caps, the combination with electro magnetic means for automatically assembling the can caps and clips, of means for automatically soldering the can caps and clips together, while clamped together by said electro magnetic clamping means, substantially as specified.

31. In a machine for automatically soldering vent clips on can caps, the combination with a continuously rotating clip carrier having electro magnetic clip holders, of a continuously rotating cap carrier having electro magnetic cap holders coöperating to receive the clips from the clip carrier, substantially as specified.

32. In a machine for automatically soldering vent clips on can caps, the combination with a continuously rotating clip carrier having an electro magnetic clip holders, of a continuously rotating cap carrier having electro magnetic cap holders coöperating to receive the clips from the clip carrier, and means for soldering the caps and clips together, substantially as specified.

33. In a machine for soldering together two pieces of metal, a pair of coöperating movable carriers each furnished with electro magnetic holders, said carriers coöperating to bring said pieces of metal into juxtaposition as the holders pass each other, substantially as specified.

34. In a machine for soldering together two pieces of metal, a pair of coöperating movable carriers each furnished with electro magnetic holders, said carriers coöperating to bring said pieces of metal into juxtaposition as the holders pass each other, and a soldering device adjacent to the path of the holders on one of said carriers, substantially as specified.

35. The combination with a movable carrier having an electro magnetic holder thereon, of a second carrier having an electro magnetic holder thereon, said carriers moving said holders in adjacent paths into juxtaposition with each other, substantially as specified.

36. The combination with a movable carrier having an electro magnetic holder thereon, of a second carrier having an electro magnetic holder thereon, said carriers coöperating to bring said pieces of metal into juxtaposition as the holders pass each other, and means for transferring the piece of metal carried by the one carrier to the other carrier, and means for soldering the two pieces of metal together while held together by the magnetic holder of said second carrier, said soldering means being adjacent to the path of the holders on said second carrier supstantially as specified.

37. In a machine for soldering together two pieces of metal, a pair of coöperating movable carriers furnished with electro magnetic holders, and a soldering device adjacent to the path of and coöperating with the holders on one of said carriers, substantially as specified.

38. The combination with a movable carrier having an electro magnetic holder thereon, of a second carrier having an electro magnetic holder thereon, and a soldering device adjacent to the path of and coöperating with the holder on the second carrier, substantially as specified.

39. The combination with a movable carrier having an electro magnetic holder thereon, of a second carrier having an electro magnetic holder thereon, and means for transferring the piece of metal carried by the one carrier to the other carrier, and a soldering device adjacent to the path of and coöperating with the holder on the second carrier, substantially as specified.

40. The combination with a movable carrier having an electro magnetic holder thereon, of a second carrier having an electro magnetic holder thereon, said carriers moving said holders in adjacent paths into juxtaposition with each other, and means for deenergizing the magnetic holder on said first mentioned carrier to transfer the article carried thereby to the holder of the second carrier as the carriers bring the holders together, substantially as specified.

LEE C. SHARP.

Witnesses:
H. M. MUNDAY,
PEARL ABRAMS.